United States Patent
Fields et al.

(10) Patent No.: US 6,581,109 B1
(45) Date of Patent: Jun. 17, 2003

(54) SYSTEM TO DYNAMICALLY ADJUST IMAGE COLORS IN CLIENT/SERVER ENVIRONMENT TO ASSURE ACCURATE COLOR REPRODUCTION

(75) Inventors: Duane Kimbell Fields, Austin, TX (US); Thomas Preston Gregg, Round Rock, TX (US); William Walter Hurley, II, Round Rock, TX (US); Mark Andrew Kolb, Round Rock, TX (US); Robyn Lou Shannon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,709

(22) Filed: Jun. 24, 1999

(51) Int. Cl.⁷ .............................................. G06F 15/16
(52) U.S. Cl. ........................ 709/246; 709/200; 709/247; 345/589
(58) Field of Search ................................ 709/246, 200, 709/247; 341/50, 126; 708/204; 345/581, 589

(56) References Cited

U.S. PATENT DOCUMENTS

| | | | |
|---|---|---|---|
| 4,931,929 A | 6/1990 | Sherman | 705/500 |
| 5,309,257 A | 5/1994 | Bonino et al. | 358/504 |
| 5,311,212 A | 5/1994 | Beretta | 345/591 |
| 5,615,282 A | 3/1997 | Speigel et al. | 382/167 |
| 5,644,647 A | 7/1997 | Cosgrove et al. | 382/162 |
| 5,677,741 A | 10/1997 | Yui | 348/649 |
| 5,774,126 A | 6/1998 | Chatterjee et al. | 345/605 |
| 5,835,098 A | 11/1998 | Lipton | 345/589 |
| 5,847,700 A * | 12/1998 | Hannah | 345/558 |
| 5,901,286 A * | 5/1999 | Danknick et al. | 345/810 |
| 5,983,262 A * | 11/1999 | Kukkal | 345/700 |
| 6,008,836 A * | 12/1999 | Bruck et al. | 345/719 |
| 6,034,689 A * | 3/2000 | White et al. | 345/760 |
| 6,049,831 A * | 4/2000 | Gardell et al. | 702/3 |
| 6,052,730 A * | 4/2000 | Felciano et al. | 709/203 |
| 6,128,668 A * | 10/2000 | Barber et al. | 709/228 |
| 6,182,073 B1 * | 1/2001 | Kukkal | 345/733 |
| 6,243,761 B1 * | 6/2001 | Mogul et al. | 709/217 |
| 2002/0041287 A1 * | 4/2002 | Engeldrum et al. | 345/589 |

* cited by examiner

Primary Examiner—Kenneth R. Coulter
Assistant Examiner—Hai V. Nguyen
(74) Attorney, Agent, or Firm—Duke W. Yee; Jeffrey S. LaBaw; Stephen R. Tkacs

(57) ABSTRACT

A web page image is modified "on-the-fly" for a specific client machine according to calibration parameters for that machine (or the user of the machine) that are generated during a one-time calibration at the client. Preferably, this calibration is effected using a software routine, e.g., a Java applet, that is downloaded to the client and executed, e.g., in a client browser. A user of the client machine runs the applet to establish a set of calibration parameters that are then stored at the server, e.g., as a user profile. When a request is later made for a given web page hosted by the server, the server identifies the user making the request and applies the calibration parameters to color adjust the image as the page including that image is served.

18 Claims, 3 Drawing Sheets

SYSTEM TO DYNAMICALLY ADJUST IMAGE COLORS IN CLIENT/SERVER ENVIRONMENT TO ASSURE ACCURATE COLOR REPRODUCTION

BACKGROUND OF THE INVENTION

1. Technical Field

The present invention relates generally to color management in a computer. More specifically, the invention relates to a technique for dynamically adjusting image colors in a client-server environment to assure accurate color reproduction of an image or graphic in a web page as the page is served from a web server to a client.

2. Description of the Related Art

The World Wide Web is the Internet's multimedia information retrieval system. In the web environment, client machines effect transactions to web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives in return a document or other object formatted according to HTML. A collection of documents supported on a web server is sometimes referred to as a web site.

Many web pages include images or graphics that are designed to have specific color or greyscale characteristics, e.g., hue, saturation, luminance, opacity, translucency, image tone, or the like, when displayed on a client machine. The exact reproduction of color on a computer system, however, is a function of many factors, such as the viewer's monitor, graphics hardware, viewing conditions, the ambient lighting, and the like. This creates a problem where the end user perceives colors differently than the designer or provider of the image intended. For example, consider a web site that sells clothing online by displaying colored images of available products. A user might decide to purchase a given product, such as a shirt, from the web site based on how he or she perceives the color of the fabric as displayed on the web page. If the user's computer system does not accurately reproduce the color intended by the designer, e.g., by representing the actual color as too dark or too light, the user may end up purchasing something that he or she did not intend.

There have been several attempts to address this problem in the prior art. In one approach, an image is processed on the server ahead of time, i.e. not dynamically, based on stored calibration settings that are tied to specific combinations of hardware and software. This approach, however, only approximates the necessary calibration settings that are required, and it further requires preprocessing for every conceivable device/software configuration. Moreover, the technique requires front end preprocessing of the image, which consumes server resources. Another known approach involves use of a plug-in or a specialized graphic viewer on the client machine to adjust image colors of served content. This technique only implements a platform-specific solution that requires additional costly and complex levels of pre- and post-processing color adjust operations.

It would be highly desirable to provide a solution that does not require specific software modifications or specialized graphics support. The present invention solves this problem.

BRIEF SUMMARY OF THE INVENTION

It is a general object of the present invention to assure that a hosted image is reproduced as intended on a wide variety of machines and hardware/software configurations.

This and other objects are achieved by abstracting the process of image correction to the server in a client-server environment and generating color corrections to an image as that image is being served. Preferably, the image is modified "on-the-fly" for a specific client machine according to calibration parameters for that machine (or the user of the machine) that are generated during a one-time calibration at the client. Preferably, this calibration is effected using a software routine, e.g., a Java applet, that is downloaded to the client and executed, e.g., in a client browser. A user of the client machine runs the applet to establish a set of calibration parameters that are then stored at the server, e.g., as a user profile. When a request is later made for a given web page hosted by the server, the server identifies the user making the request and applies, the calibration parameters to color adjust the image as the page including that image is served. In this way, each user of a client machine may provide calibration data to the server, which then serves different color-adjusted versions of the image to the respective client machines as a function of that data. Thus, for example, one particular user might receive a version of the image that has been color-adjusted to alter a given hue. Yet another user might receive a version of the image that has been color-adjusted to alter a given saturation. A third user might receive still another version of the image that has been color-adjusted for luminance. Thus, the particular version of the image served to a particular user of a client machine will be dependent on the data collected as a result of the user executing the calibration applet.

According to the invention, each user defines a set of calibration parameters by running through a series of simple tests that measure perceived or actual differences in color reproduction on the user's particular machine configuration. These settings are then sent to the server, where they are saved in a user profile. Once a client is configured, the individual settings are applied to a dynamic image preprocessor that runs on the server to correct image tone, saturation, brightness, or the like as a function of the unique calibration parameters to assure that the image is reproduced accurately on the user's particular computer system.

In accordance with another feature of the invention, a method for serving color adjusted web pages to a plurality of web clients begins by sending a calibration applet to respective client machines. A web server then receives inputs from the calibration applet from the respective client machines. A given user profile for each user is then stored at the server. The profile includes information identifying the user, together with the calibration data derived from local execution of the calibration applet by the user. Later, in response to a request for a web page from a given client machine, the server identifies the user and adjusts a default web page according to his or her user profile to produce an adjusted web page. The adjusted web page includes at least one image or graphic that has been adjusted according to the calibration parameters input as a result of the user executing the calibration applet on the user's machine. The server then serves the adjusted web page to the requesting client. This page is then rendered on the client machine using local resources (e.g., a web browser).

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
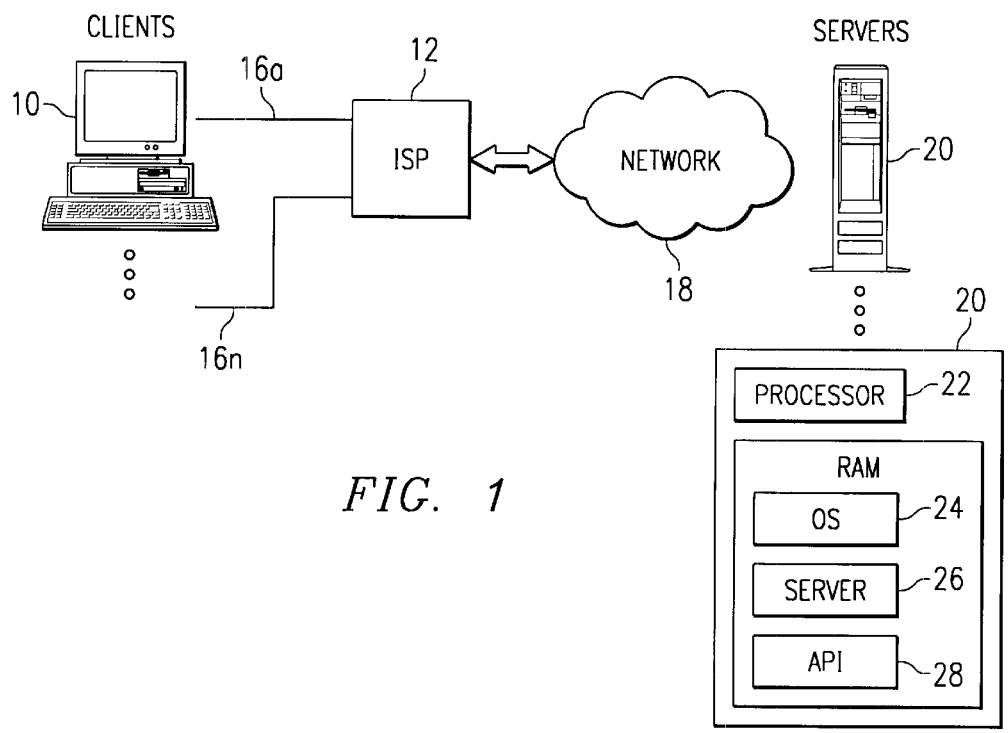
FIG. 1 is a simplified illustration of a client-server environment in which the present invention may be implemented.

A representative system in which the present invention is implemented is illustrated in FIG. 1. A plurality of Internet client machines 10 are connectable to a computer network Internet Service Provider (ISP) 12 via a network such as a dialup telephone network 14. As is well known, the dialup telephone network usually has a given, limited number of connections 16a–16n. ISP 12 interfaces the client machines 10 to the remainder of the network 18, which includes a plurality of web content server machines 20. Network 18 typically includes other servers for control of domain name resolution, routing and other control functions. A client machine typically includes a suite of known Internet tools, including a Web browser, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system. A representative web server 20 is an IBM Netfinity server comprising a RISC-based processor 22, the AIX® operating system 24 and a web server program 26. The server may include an application programming interface (API) 28 that provides extensions to enable application developers to extend and/or customize the core functionality thereof through software programs including plug-ins, servlets, and the like.

One such program is a color adjust mechanism of the present invention. As used herein, "color adjust" refers to the modification of any given color or greyscale characteristic (e.g., hue, saturation, luminance, opacity, translucency, tone, or the like) of a given image or graphic representation that may be served from a given web server 20 to a given Internet client machine 10. As described briefly above, the color adjust mechanism provides server-side processing of images or graphics as such objects are served to a particular client machine (and, in particular, to a given user at the client machine).

Figure 2:
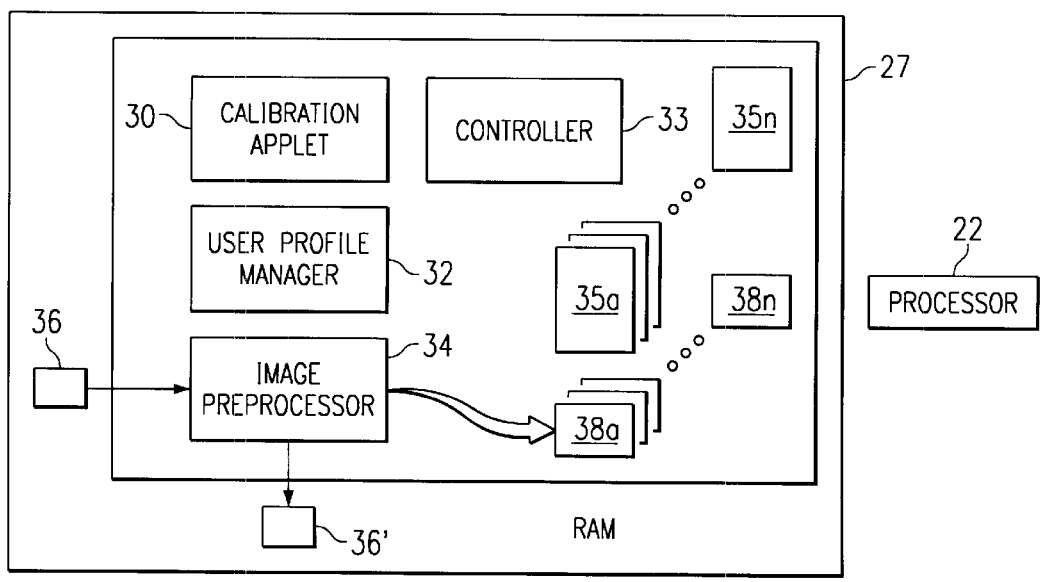
FIG. 2 is a block diagram of the various functional components of the color adjusting mechanism of the present invention.

Referring now to FIG. 2, the color adjust mechanism may be implemented most conveniently in software, namely, as a set of instructions that are executed in a processor. Thus, for purposes of illustration, FIG. 2 shows the mechanism 25 as being resident in system memory (e.g., RAM) 27 associated with a given processor 22 operating within the server platform 20. The color adjust mechanism 25 includes several functional components: a calibration applet 30, a user profile manager 32, a controller 33, and a dynamic image preprocessor 34. The calibration applet 30 comprises a set of Java class files and is adapted to be served to given client machines in the network. The applet 30 is executable in the user's client machine using local resources, e.g., a web browser or other graphics viewer. As will be seen, the calibration applet is designed for one-time execution on the client machine by a particular user to generate a set of calibration data that uniquely defines how the user perceives given color characteristics on his or her particular machine configuration. As is well-known, the exact reproduction of color on a computer system is a function of the viewer's monitor, graphics hardware, viewing conditions, lighting, personal taste, and the like. Execution of the calibration applet on a given machine by a given user generates data that is then returned to the server.

The user profile manager 32 receives the data generated by execution of the calibration applets on client machines and manages the storage and retrieval of that data. In particular, upon receipt of the calibration data from a given client machine, the manager 32 generates a user profile 35, which is a data structure (such as a flat data file, an array, a linked list, or the like), that identifies a given user and the particular calibration data generated at the user's machine as a result of local execution of the calibration applet 30 on that machine. Of course, multiple users may execute a calibration applet at a given client machine. Thus, there may be multiple user profiles 35a–n for each client machine.

The dynamic image preprocessor 34 is the component that receives a default image 36 as an input and generates a color-adjusted image 36' for service to the client machine. The image preprocessor preferably provides this function dynamically, namely, as the image is being served to the client in response to a request (e.g., a HTTP GET request) received at the server. Typically, the dynamic image preprocessor 34 includes a set of one or more compensation routines 38a–38n that provide the color adjust functionality. The routines 38a–38n receive as control inputs the user's specific calibration data generated by local execution of the calibration applet. A representative compensation routine 38 is a gamma (midrange response) correction filter. Other compensation routines include a routine for resolution adaptation, a routine to correct or adjust given color characteristics (i.e. brightness, contrast, etc.), a color palette adjustment routine, and the like. The controller 33 responds to a client request as follows. It controls the user profile manager to retrieve the appropriate user profile, which it then provides to the dynamic image preprocessor to facilitate the color adjust functionality. This process will not be described in more detail.

Figure 3:
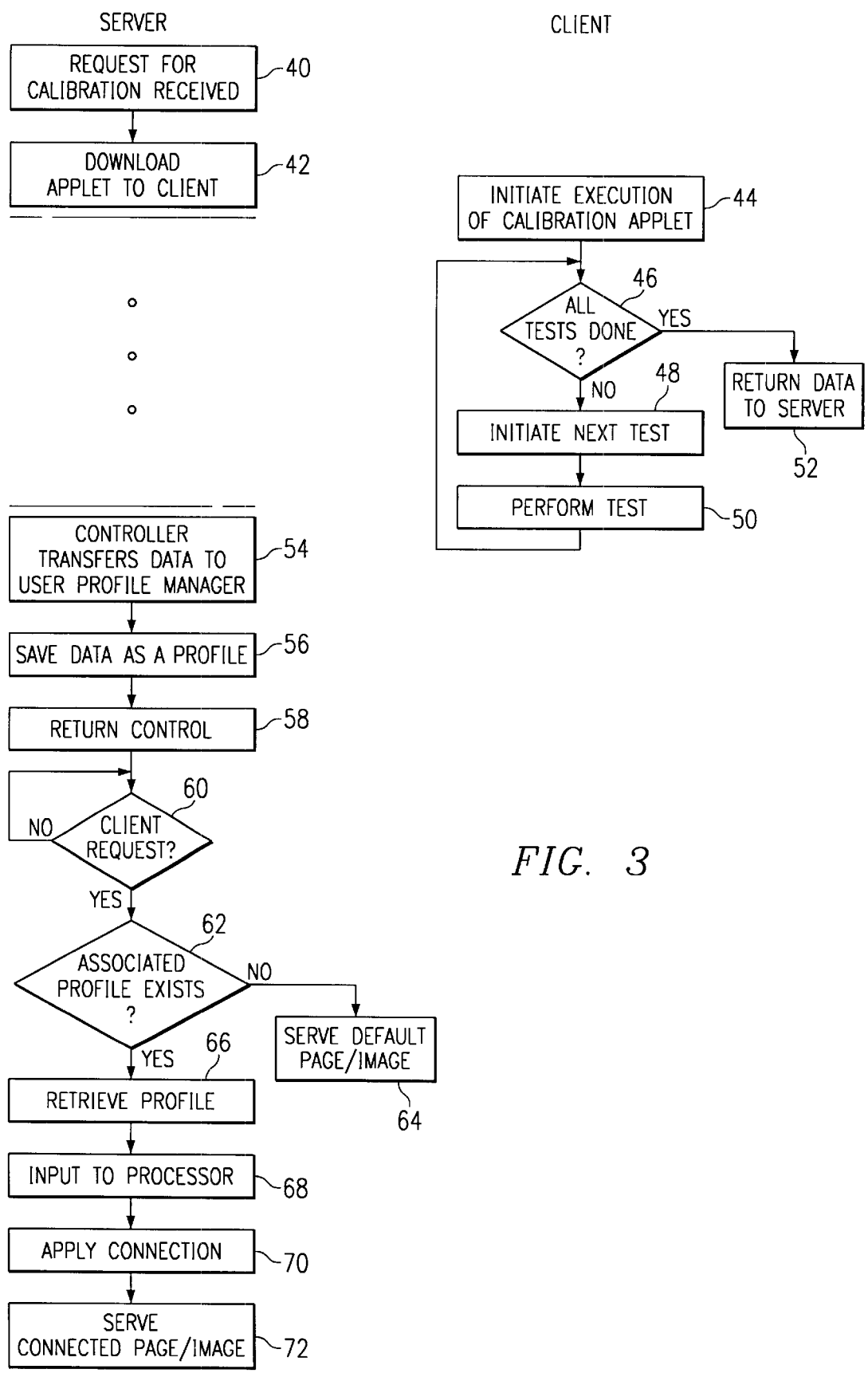
FIG. 3 is a flowchart illustrating the basic operating principles of the present invention.

FIG. 3 is a flowchart illustrating the basic operation of the color adjust mechanism of the present invention. The routine begins at step 40 when the server (and, in particular, the controller 33) receives a request for calibration. The particular manner in which a user is prompted to calibrate his or her machine configuration is not an aspect of the present invention. One technique that may be used is to have a web server (that provides the inventive functionality) identify itself to prospective client machine users as "color adjust-enabled" or the like. A user who desires to receive color adjusted images from that site would then activate a link or the like and receive a download of the calibration applet. This is step 42 in the flowchart. Control then transfers to the client machine. At step 44, the client machine initiates execution of the calibration applet. As is well-known, most client browsers include a Java Virtual Machine that processes Java class files; thus, the calibration applet is typically executed in a browser. At step 46, a test is performed to determine whether the user has completed all required tests. If not, the routine gets the next test at step 48. The user then executes the test at step 50. Control is then returned to step 46. When all required tests have been completed, the routine branches to step 52. At this point, the calibration applet returns a set of calibration data back to the controller 33 at the server. The applet also returns given information (e.g., a cookie) to later identify the client machine user to the server.

Preferably, the calibration applet is executed just one time (for a given user) at the client machine. This is not a limitation of the invention, however. Of course, the user may re-execute the calibration applet if the user's display monitor is replaced. In addition, the user may also desire to execute the calibration applet for each different browser that is used on the client machine. The calibration data may also be stored and delivered to the server on a per-browser basis. In the preferred embodiment, the remainder of the processing then occurs at the server. In particular, the routine continues at step 54 with the controller 33 transferring the received calibration data to the user profile manager. At step 56, the user profile manager saves the user's calibration data and identifier in local storage (e.g., system memory, hard disk, or the like). At step 58, control is returned back to the controller 33.

The controller tests for a client request repeatedly at step 60. If a client request is received, the operation continues at step 62 with the controller 33 testing to determine whether the client request has been issued by a client having a stored user profile. If not, the routine branches to step 64 to serve a default web page. If the client request has been recognized, however, the controller instructs the user profile manager to retrieve the user profile from storage. This is step 66. At step 68, the retrieved user profile is supplied to the dynamic image preprocessor. At step 70, the image preprocessor applies a given image correction to the default web page. The resulting color-adjusted web page is then served at step 72. This completes the processing.

Figure 4:
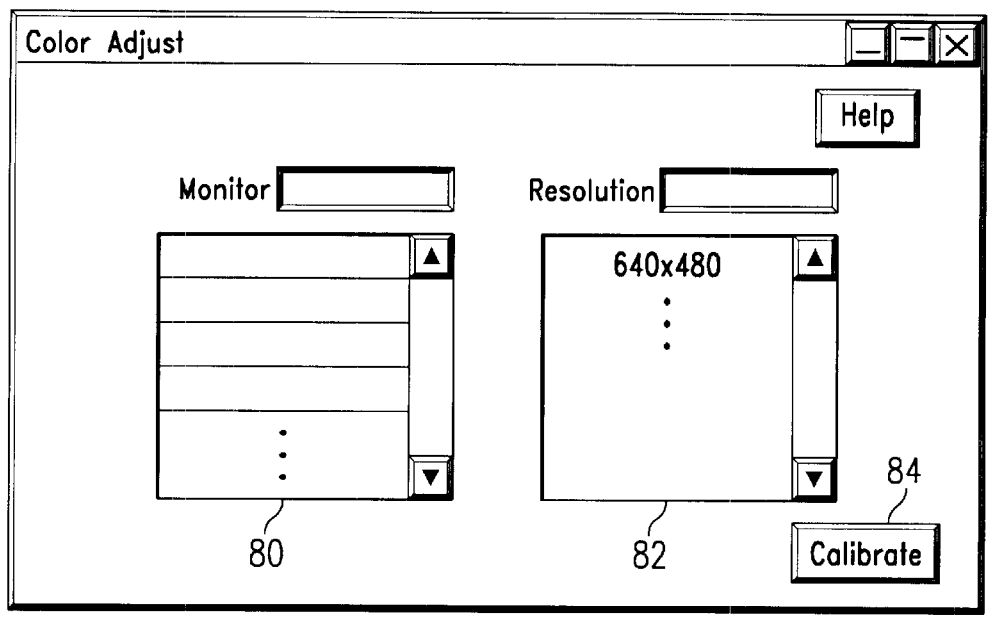
FIG. 4 illustrates a representative interface for a calibration applet of the present invention.
Figure 5:
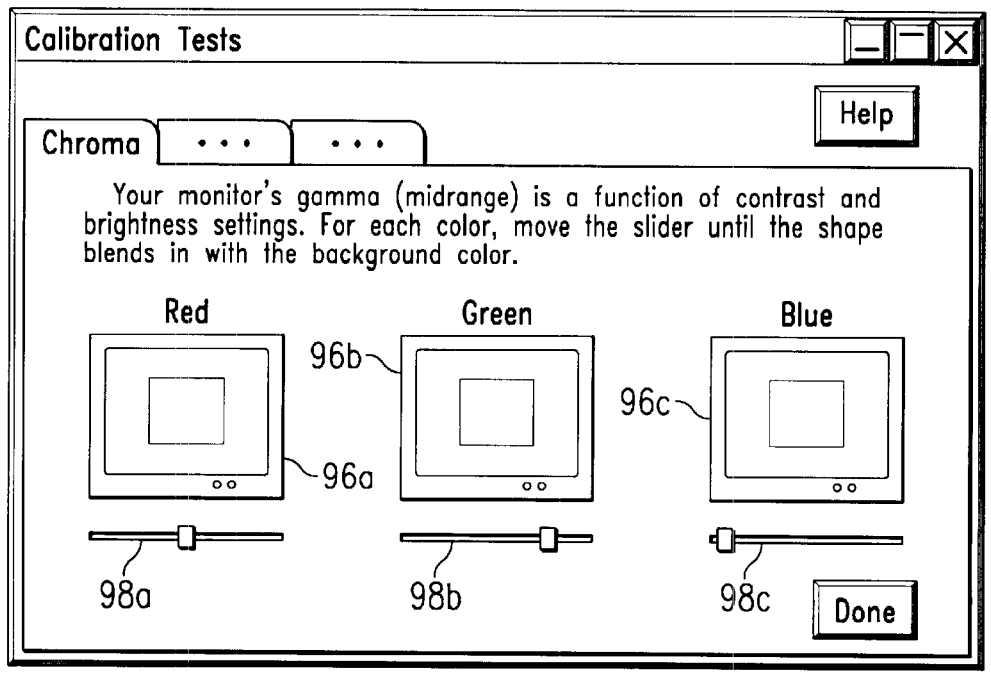
FIG. 5 illustrates how the user may perform a gamma correction test.

Thus, in the preferred embodiment, a color-adjusted web page is served to a given user that has previously provided calibration data to the server. As described above, the preferred technique for providing such data involves execution of the calibration applet in the user's client machine. That applet instructs the user to perform a series of simple tests that measure perceived or actual differences in color reproduction on the user's particular machine configuration. These tests are illustrated in FIG. 5. Before these tests are performed, the calibration applet may request that the user identify the computer's monitor and display resolution. FIG. 4 illustrates a representative user interface generated for this purpose, although this display panel may be omitted if desired.

The interface includes a listbox 80 identifying a set of commercial monitors. Another listbox 82 identifies the available display resolution for each display monitor that may be selected from the listbox 80. Other controls (e.g., a greyscale adjustment) may be implemented as well. Once the user identifies his or her monitor and the existing display resolution, he or she may execute a set of one or more calibration tests by selecting the Calibrate button 84. As noted above, this display panel may be omitted, in which case the calibration applet launches with the display panel of FIG. 5.

As noted above, a representative calibration test is gamma or midrange correction. The interface 86 illustrated in FIG. 5 is a monitor calibration tool that enables the user to visually set the gamma for each of the red, green and blue CRT phosphors on the user's display monitor. As can be seen, the interface screen displays the three colors in areas 96a, 96b and 96c. Each area includes a given shape that can be visually perceived. Each area (corresponding to red, green and blue) has an associated slider control 98a–98c that is adjustable by the user. For each of the three colors, the user is instructed to move the slider until the shape in the middle of the given area blends in with the background as much as possible. After the user completes this test, he or she moves to the next test. Once all of the tests are completed, the collected calibration data is sent to the server as previously described.

Representative calibration data includes offset values to adjust red, green and blue color components of the images supported on the web server. As noted above, the calibration data is preferably stored at the server in a user profile; alternatively, such data is included in the HTTP request (e.g., encoded in a cookie). When needed, the server uses the calibration data to make the necessary adjustments to the image color characteristics. In particular, the offsets serve as inputs to the gamma correction algorithm, which supplies the appropriate correction required.

A representative client on which the applet is run is a personal computer, notebook computer, Internet appliance or pervasive computing device (e.g., a PDA or palm computer) that is x86-, PowerPC®- or RISC-based. The client includes an operating system such as IBM® OS/2®, Microsoft Windows, Microsoft Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications. The calibration applet is executable in the JVM in a well-known manner.

The present invention provides numerous advantages over the prior art. A major advantage is that the image correction is supplied only when it is needed, namely, at the time when the server has received a request for the image from a user that has already supplied calibration data for his or her particular machine configuration. Thus, the color-adjusted image is served dynamically (i.e. on-the-fly) as it is requested. The server need only store a single copy of the image, namely, the default image, and there is no requirement for front-end preprocessing and storage of that image.

As can be seen, the present invention enables each of a set of client machines (or each of a set of client machine users) to receive different color-adjusted versions of the same image or graphic (or the same web page that includes such image or graphic). The invention abstracts color correction to the server, and the requesting clients require no specific software modifications or specialized support (other than the initial, one-time end user calibration). The result is a robust system that dynamically adjusts image colors in a client-server environment to assure accurate color reproduction of images of users in that environment.

Moreover, web sites that support the inventive functionality may advertise and promote that they are color-adjust enabled according to the present invention to increase visibility and attract new users and advertisers.

While it is preferred to deliver the calibration data to the server after the calibration applet is executed locally, this is not a requirement of the invention. It is within the scope of the invention to maintain the calibration data at the client and then serve such data together with the HTTP request for the given web page. This obviates storage of the user profile at the server but, of course, requires additional client processing functionality. This alternative technique still enables the image to be color-corrected dynamically as the web page is being served. Yet another alternative is for the client to send the calibration data whenever it issues an HTTP request. The servers that are provisioned to respond to such data (and serve color-adjusted images in response) process the data together with the request; servers that do not have the inventive functionality simply ignore the data.

As noted above, the above-described functionality preferably includes a server side piece and a client side piece. The server side piece comprises the controller, user profile manager and image preprocessing routines. The controller and user profile manager may be implemented as a Java servlet or as standalone code. The image preprocessing routines may be commercially available programs that provide known image correction functions. The client side piece is preferably a Java applet, although the client piece may be written in native code. In either case, preferably the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by letters patent is set forth in the following claims.

What is claimed is:

1. A method for serving color adjusted web pages to a plurality of web clients, comprising the steps of:
   sending a calibration applet to respective clients wherein the respective clients run the calibration applet to establish parameters of user profiles for color adjusting an image of a default web page;
   at a web server, receiving the parameters from the calibration applet from the respective clients;
   responsive to a request for a web page from a respective requesting client, adjusting the default web page according to the parameters for the respective requesting client to produce an adjusted web page.

2. The method as described in claim 1 further including the step of determining whether a respective requesting client has an associated user profile prior to the adjusting step.

3. The method as described in claim 2 wherein if the respective requesting client does not have an associated user profile, the method further includes the step of:
   serving the default web page to the requesting client.

4. The method as described in claim 1 wherein the calibration applet is served from the web server.

5. The method as described in claim 4 wherein the calibration applet is served in response to a user request.

6. The method as described in claim 1 wherein the step of adjusting the default web page comprises applying a given color characteristic correction to the default web page.

7. The method as described in claim 6 wherein the given color characteristic correction is a gamma correction.

8. The method as described in claim 1 further including the steps of:
   at a requesting client, executing the calibration applet;
   collecting calibration data; and
   returning the collected calibration data to the web server.

9. The method as described in claim 8 wherein the calibration data includes data that measures how a user of the requesting client perceives differences in a given color reproduction.

10. The method as described in claim 8 wherein the calibration data identifies a type of display monitor used at the requesting client.

11. The method as described in claim 8 wherein the calibration data identifies a resolution of the display monitor used at the requesting client.

12. The method as described in claim 1 wherein a requesting client has one or more user profiles associated therewith.

13. The method as described in claim 1 further including the step of storing user profiles based on the parameters received from the respective clients.

14. The method as described in claim 1 further including the step of serving the adjusted web page to the requesting client.

15. A computer program product in a computer-readable medium for serving color-adjusted web pages to a plurality of web clients, comprising:
   a calibration applet executable at a given web client for generating calibration data;
   means for storing user profiles, each user profile including calibration data generated as a result of executing the calibration applet at a given web client; and
   means responsive to a request for a web page and operative as the web page is being served for modifying given image data in the web page according to a given color characteristic correction function.

16. A server operative in a computer network, comprising:

a calibration applet executable at a given web client for generating calibration data;

means for storing user profiles, each user profile including calibration data generated as a result of executing the calibration applet at a given web client; and means responsive to a request for a web page and operative as the web page is being served for modifying given image data in the web page according to a given color characteristic correction function.

17. The server as described in claim 16 wherein the given color characteristic function is derived from the calibration data provided to the web server from a given web client.

18. The server as described in claim 17 wherein the given color characteristic function is a gamma correction.

* * * * *